May 22, 1923.  S. M. DE PROCOUDINE-GORSKY  1,456,427

OPTICAL SYSTEM FOR PHOTOGRAPHIC CAMERAS

Filed May 11, 1922

Inventor
S. M. de Procoudine-Gorsky,
By Marks Clerk
Attys.

Patented May 22, 1923.

1,456,427

UNITED STATES PATENT OFFICE.

SERGE MICHAEL DE PROCOUDINE-GORSKY, OF NICE, FRANCE.

OPTICAL SYSTEM FOR PHOTOGRAPHIC CAMERAS.

Application filed May 11, 1922. Serial No. 560,227.

*To all whom it may concern:*

Be it known that I, SERGE MICHAEL DE PROCOUDINE-GORSKY, a citizen of Russia, and residing at Villa Joliette, Avenue Cauvin, St. Sylvestre, Nice, France, have invented certain new and useful Improvements in and Relating to Optical Systems for Photographic Cameras (for which I have filed an application in Great Britain on April 30th, 1921), of which the following is a specification.

This invention relates to improvements in optical systems for photographic cameras, particularly those suitable for photography in natural colours.

The object of the invention is the provision of a camera having an optical system by means of which it is possible to obtain two or more identical images.

The invention consists in optical means for a photographic camera comprising a series of rhomboidal prisms forming a combination prism, adapted to permit the rays of light passing from the object to two or more images thereof to be projected along one and the same central axis within the combination prism and then divided by partial reflection and penetration through secondary reflecting surfaces.

The invention also consists in an optical system for a photographic camera comprising a series of rhomboidal prisms arranged in such manner that the light rays from the object are reflected so as to form three identical images on three picture areas of a sensitive surface or surfaces, the parallel faces of the said prisms, which are coplanar, being provided with a substance having a refractive index differing from that of the glass, or a partially silvered or other suitable surface to act as a partial reflector.

The invention also consists in an apparatus as set forth in the preceding paragraph in which the reflected rays are passed through lenses situated at varying distances from the prisms and the sensitive surface of the film or films.

The invention also consists in a method of correcting the distortion of the images produced by apparatus as set forth in the preceding paragraphs, due to longitudinal parallax characterized by placing the film gates in planes parallel to each other but at different distances from the central axis of the combination prisms.

The invention also consists in a method of correcting the distortion of the images produced by apparatus as set forth above, due to longitudinal parallax characterized by equalizing the path of the light rays in the media through which the said rays pass.

The invention also consists in a method of preventing reflection in an optical system as set forth in the preceding paragraphs by those portions of the surfaces not covered by a reflecting medium by the application thereto of a substance having a refractive index equivalent to that of the material of the prisms.

The invention also consists in a method of correcting the distortion of the images produced by apparatus as set forth in the preceding paragraphs when using ordinary photographic objectives characterized by placing a symmetrical lens or lenses in front of the system of prisms or in front of each objective.

The invention also consists in the use in an optical system as set forth of objectives having their focal lengths corrected for use with light rays of a definite wave length corresponding to a region of the spectrum and those rays passed by the light filters or colour screens used in a system of colour photography, substantially as hereinafter described.

The invention further consists in the optical systems and modifications thereof hereinafter described.

In order that the carrying of the invention into effect may be understood, reference will now be made to the accompanying drawings, in which:—

Figure 1:
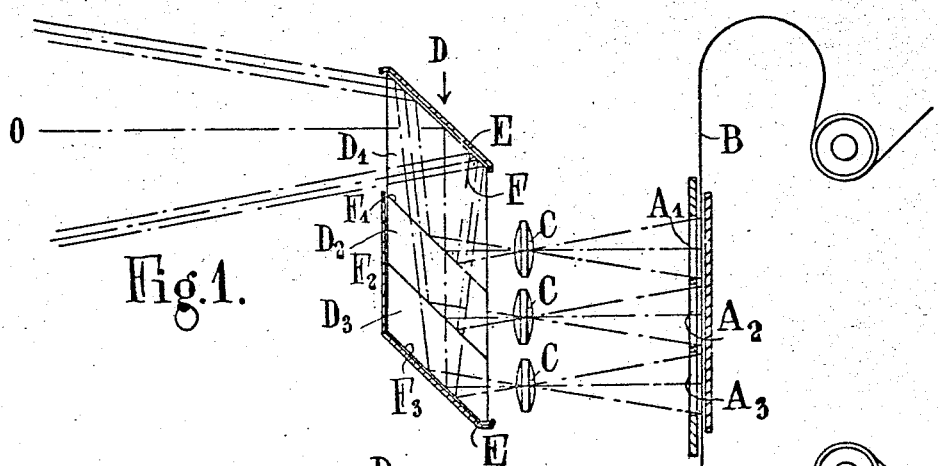
Figure 1 illustrates a method of carrying the invention into effect suitable for the simultaneous production of three identical images upon one kinematograph film.

In carrying the invention into effect in one form, and as illustrated in Figure 1 of the accompanying drawings, and taking by way of example an apparatus suitable for the simultaneous production of three identical images upon one kinematograph film, the film passes through a gate frame, A, of the usual form having three apertures, $A_1$, $A_2$ and $A_3$ therein, each corresponding to a picture area of the standard kinematograph film, and arranged to expose three successive picture areas. The film, B, is moved forward by a known form of intermittent mechanism but which is adapted to move the film forward at each shift a distance corresponding to three picture spaces. A suitable objective, C, is placed in front of each aperture and in front of the objectives a prism, D, is provided comprising three separate prisms, $D_1$, $D_2$, and $D_3$, of rhomboidal section mounted in one frame, E, the said separate prisms, $D_1$, $D_2$ and $D_3$ having one pair of their parallel faces coplanar. The rays of light radiating from the object, O, strike against a primary reflecting surface, F, of the prism and are reflected on to secondary reflecting surfaces, $F_1$, $F_2$ and $F_3$, which in turn reflect a certain proportion of the light rays through the objectives, C, on to the film B; the said secondary reflecting surfaces, $F_1$, $F_2$ and $F_3$ are situated at the face of each separate prism, $D_1$, $D_2$ and $D_3$ remote from the primary reflecting surface F. In this manner three images are produced on the film, B, without lateral parallax.

As the distances the rays travel to each section of the film are not equal, corrections should preferably be made and the linear inequality or longitudinal parallax may to a certain extent be compensated, either by allowing for the correction of this distortion when designing or calculating the objectives, C, or by the adjustment of the focal length of the objectives, C, in such manner that images of the same size are obtained at the expense of clearness, i. e., one of the images may be accurately focussed while the others probably of colour sensations not so important in colour photography are slightly indistinct; or by a combination of the foregoing methods. It is obvious that owing to the necessity of compensating for longitudinal parallax the objectives, C, will move different distances when focusing, but always in definite relationship to each other.

Figure 2:
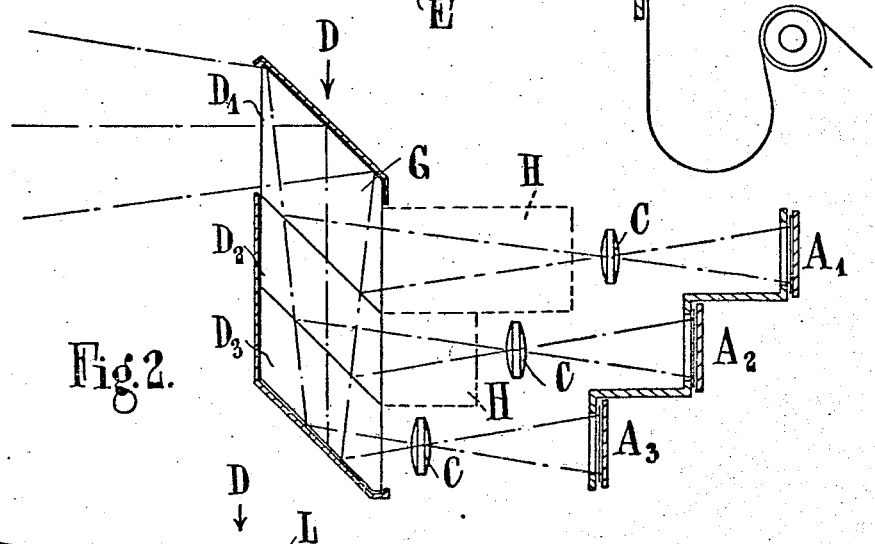
Figure 2 illustrates a method of carrying the invention into effect suitable for the simultaneous production of three identical images upon three separate kinematograph films.

In carrying the invention into effect in another form and as illustrated in Figure 2, taking by way of example an apparatus suitable for the simultaneous production of three identical images upon three separate kinematograph films, an optical system is provided of similar construction to that described in the previous example, but with the difference that the objectives, C, and their corresponding gate frames and gates, $A_1$, $A_2$ and $A_3$, for the three films are arranged in planes parallel to each other but at different distances from the central axis, G, of the combination prism. This arrangement enables the length of the path of the light rays from the object to the films to be the same in each case and thus eliminate errors due to longitudinal parallax. Another advantage is that objectives, C, of the same focal length may be used to produce identical images. The films are moved forward by a known form of intermittent mechanism, which in contradistinction to the previous example, is adapted to move the films forward at each shift a distance corresponding to one picture space.

As in the first example, the lengths of the paths of the rays in the prisms are different for each image, but in this case and the modification thereof hereinafter described the degree of distortion is corrected by equalizing the lengths of the rays in the substance of the prisms, $D_1$, $D_2$ and $D_3$, and the air in such manner that the length of the medium passed through is the same for the three images. This may be done by placing a correction component, H, between the prisms, $D_1$ and $D_2$ and the objectives, C, the said component, H, preferably comprising a prism of suitable length and of the same material as the reflecting prisms, $D_1$, $D_2$ and $D_3$. In this case all three objectives, C, having the same focal lengths can have the same correction due to prism distortion. In cases, however, where absolute correction is not essential the correction of the objectives, C, for prismatic distortion can be neglected and ordinary photographic lenses may be used.

Figure 3:
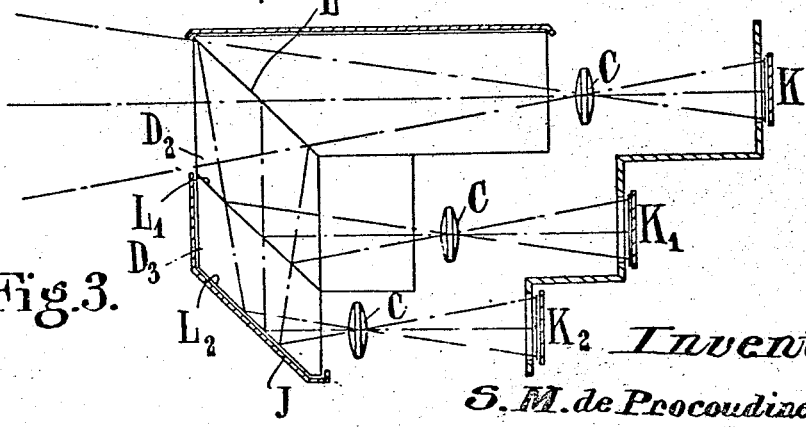
Figure 3 is a modified form of the invention illustrated in Figure 2.

In a modified form of the foregoing examples and as illustrated in Figure 3 of the accompanying drawings, the prisms, D, may comprise two separate prisms, $D_2$ and $D_3$ of rhomboidal section mounted in one frame, J, and having one pair of their parallel faces coplanar. That is to say, the prism, $D_1$ bearing the primary reflecting surface F, (Figures 1 and 2) may be eliminated and the prism, $D_2$, which corresponds to the first of the secondary prisms shown in Figures 1 and 2 may be adapted to permit rays to pass through the first of the series of objectives, C, on to the first film area, K, in addition to reflecting from surfaces L and $L_1$ a proportion of the rays through the second of the series of objectives, C, on to the second picture area, $K_1$, and a second prism, $D_3$, which reflects by the surface, $L_2$, the rays through the third of the series of objectives, C, on to the third picture area, $K_2$. By reason of the surface, L, which corresponds to the primary reflecting surface, F (Figures 1 and 2) permitting rays to pass one of the secondary reflecting surfaces is eliminated, and thus more light reaches the sensitive surface of the films, K, $K_1$, $K_2$.

The regulation of the amount of partial reflection from the secondary reflecting surfaces and the penetrability of a proportion of the rays through the secondary reflecting surfaces may be carried out, for example, by the provision at the said reflecting surfaces of a substance having a refraction index differing from that of the glass, or by ruling or otherwise producing a metallic or other suitable partial reflecting surface on the secondary reflecting surfaces. Thus a portion of the rays of light may penetrate the mirror or secondary reflecting surface while others are reflected. The total reflecting surfaces of the prisms are, of course, plane mirrors, and may either be silver plated or simply blackened on their surfaces in a known manner.

When using ordinary photographic objectives the correction of the distortion of the images may be effected either by placing a symmetrical lens or lenses in front of the system of prisms or in front of each objective so that the images are distorted, the distortion being such that when combined with the distortion due to the system of prisms they will counteract each other. The lens which is referred to as a symmetrical lens has parallel curved surfaces which, if extended, would form concentric spheres.

Specially designed objectives may be used which correct distortion due to the prisms. In this case the three objectives used are calculated so that their focal lengths are corrected for use with light rays of a definite wave length corresponding to a region of the spectrum and those rays passed by the light filters or colour screens used in a system of colour photography. The focal length of the objectives so designed should be equal and strictly limited to the rays of the wave length of the region of the spectrum to which the rays passed by the light filters or colour screens correspond. Into the calculations of these objectives functions are introduced for the compensation of the chromatic aberration of the rays of the spectral area corresponding to the colour of the light filters or colour screens used in the system of colour photography. The general chromatic aberration of other rays is neglected.

The prisms may be attached to each other by means of Canada balsam, or other suitable substance which has an it lex of refraction equal to that of the material of the prisms. It is to be understood that the partial reflecting surfaces are suitably protected and that the light filters incidental to a colour photographic process are situated in suitable positions.

Having now described my invention, what I claim as new and desire to secure by Letters Patent is:—

1. An optical system for a photographic camera comprising a sensitive medium a series of rhomboidal prisms forming a combination rhomboidal prism for reflecting the light rays from the object to form three identical images on three picture areas of a sensitive medium, the parallel faces of the said prisms, which are coplanar, being provided with a substance having a refractive index differing from that of the glass, to act as a partial reflector.

2. An apparatus as set forth in claim 1 in which the reflected rays are passed through lenses situated at varying distances from the prisms and the sensitive surface of the medium.

3. Apparatus as claimed in claim 1 wherein means is provided for correcting the distortion of the images produced due to the longitudinal parallax, consisting of film gates arranged parallel to each other but at different distances from the central axis of the combination prism.

4. Apparatus as claimed in claim 1 wherein means is provided for preventing the reflection by those portions of the surfaces not covered by a reflecting medium by the application thereto of a substance having a refractive index equivalent to that of the material of the prisms.

5. Apparatus as claimed in claim 1 wherein symmetrical lenses are arranged between the combination prism and the three picture areas on the sensitive medium.

In testimony whereof I have signed my name to this specification.

SERGE MICHAEL DE PROCOUDINE-GORSKY.